US008260887B2

United States Patent
Vinel et al.

(10) Patent No.: US 8,260,887 B2
(45) Date of Patent: Sep. 4, 2012

(54) METHOD FOR AUTOMATIC CONFIGURATION OF AN ACCESS ROUTER COMPATIBLE WITH THE DHCP PROTOCOL, FOR SPECIFIC AUTOMATIC PROCESSING OF IP FLOWS FROM A CLIENT TERMINAL

(75) Inventors: Romain Vinel, Trebeurden (FR); Fabien Battello, Perros Guirec (FR)

(73) Assignee: France Telecom, Paris (FR)

( * ) Notice: Subject to any disclaimer, the term of this patent is extended or adjusted under 35 U.S.C. 154(b) by 364 days.

(21) Appl. No.: 12/400,480

(22) Filed: Mar. 9, 2009

(65) Prior Publication Data

US 2010/0064032 A1    Mar. 11, 2010

Related U.S. Application Data

(63) Continuation of application No. 10/884,131, filed on Jul. 2, 2004, now abandoned.

(30) Foreign Application Priority Data

Jul. 4, 2003  (FR) ...................................... 03 50296

(51) Int. Cl.
*G06F 15/177*    (2006.01)
(52) U.S. Cl. ........................................................ 709/220
(58) Field of Classification Search .................... 709/220
See application file for complete search history.

(56) References Cited

U.S. PATENT DOCUMENTS

| | | | |
|---|---|---|---|
| 6,223,222 B1 | 4/2001 | Fijolek et al. | |
| 6,427,170 B1 * | 7/2002 | Sitaraman et al. | 709/226 |
| 2002/0046263 A1 | 4/2002 | Camerini et al. | |
| 2002/0165972 A1 * | 11/2002 | Chien et al. | 709/229 |
| 2003/0101217 A1 | 5/2003 | Aiyoshi et al. | |
| 2003/0101243 A1 * | 5/2003 | Donahue et al. | 709/220 |

* cited by examiner

*Primary Examiner* — Hussein Elchanti
*Assistant Examiner* — Maceeh Anwari
(74) *Attorney, Agent, or Firm* — Pearne & Gordon LLP (57) ABSTRACT

Method and device for automatic configuration of an access router 2, compatible with the DHCP protocol, for controlling resources for a client terminal 1, as a function of a profile associated with the terminal client line and an ID identifier of the terminal client line, in a computer network, starting from the configuration phase of the terminal by a DHCP 3 server in the network; the router routing the DHCP traffic of the terminal with the server. The ID identifier, inserted 5 in the DHCPREQUEST message 4 broadcast by the terminal, is used 9 to query 10 a profiles server 11 that transmits 12 the corresponding profile in response; Extraction 14 of the parameters of the transmitted profile 13 configures 15 the router so that it can be able to process terminal flows.

20 Claims, 3 Drawing Sheets

METHOD FOR AUTOMATIC CONFIGURATION OF AN ACCESS ROUTER COMPATIBLE WITH THE DHCP PROTOCOL, FOR SPECIFIC AUTOMATIC PROCESSING OF IP FLOWS FROM A CLIENT TERMINAL

This application is a continuation of U.S. patent application Ser. No. 10/884,131 filed Jul. 2, 2004, which is incorporated herein by reference in its entirety.

TECHNICAL DOMAIN

This invention relates to a method and device for automatic configuration of an access router compatible with the DHCP protocol for specific automatic processing of IP flows from a client terminal in a computer network, as a function of a given set of values of flow processing parameters corresponding to the client line from the client terminal, the access router routing DHCP traffic between the client terminal and any DHCP server on the network capable of proposing a lease to this client terminal. The network part related to configuration according to the DHCP protocol comprises a client/server type architecture. DHCP traffic between a terminal and a DHCP server denotes the traffic necessary for configuration of the terminal according to the DHCP protocol, by the server. The connection line between a client terminal and an access router on which flows between the terminal and the router transit, is called the client line and therefore corresponds to the client terminal.

Therefore, the invention relates to computer networks and the technical domain of the invention is configuration of equipment in such networks by means of configuration protocols and more particularly control of resources on network equipment (in other words configuration of this network equipment to program parameters specific to a client connection). In this case, the networks considered are networks on which the traffic, and particularly communications between processes, depends on protocols (or sets of rules and procedures to be respected to send and receive data on a network) in the TCP/IP (<< Transmission Control Protocol/Internet Protocol>>) [1] series of communication protocols used on Internet. The term network is equally applicable to a private network or a public network, or several private or public networks of telecommunication operators connected to each other through routers. Connections or Internet accesses to these networks may be high speed, for example by ADSL (<< Asymmetric Digital Subscriber Line>>. Therefore, messages circulating on the networks considered are in the form of data packets (or IP datagrams) according to the IP protocol (or Internet protocol [2]), the terms IP traffic or IP flow will also be used (an IP flow is defined by elements contained in the header of IP packets (source or destination IP address, protocol, source or destination ports, service type, etc.)).

In particular, the DHCP (<< Dynamic Host Configuration Protocol>>) [3] protocol enables client equipment connected to the network (or that renews its lease) to obtain its configuration, and particularly its IP address, dynamically from a DHCP server for the duration of the lease awarded by the server. There are four phases involved in obtaining a lease by a client terminal, network host:

the client broadcasts a configuration request on the network in the form of a DHCPDISCOVER message, to find a DHCP server;

one or several DHCP servers on the network that received the DHCPDISCOVER message will respond by sending a DHCPOFFER message that contains a lease offer;

the client broadcasts a DHCPREQUEST message in reply to this offer, to indicate that it accepts the lease offer from a given DHCP server;

the DHCP server concerned replies with a DHCPACK message to confirm the lease and particularly to assign an IP address to the client (the other servers then withdraw their offers).

DHCP servers may be on the same network or they may be on different interconnected networks, and in this case they will need to install a DHCP relay agent on network equipment (often a router) so that it can intercept broadcast messages (that cannot normally pass through a router) and direct them towards the servers for which it knows the IP addresses and which are not on the client's LAN. Thus, a DHCP relay agent relays DHCP messages between a client and a DHCP server that are not on the same LAN, so that a centralized DHCP service can be implemented for a set of local networks.

Applications of the invention relate to computer networks and telecommunication networks (digital subscriber lines at ordinary speed, for example with a client cable connection, or high speed lines, for example an ADSL connection) and Internet accesses of equipment to these networks.

State of Prior Art

Most ADSL Internet accesses now use the Point-to-Point Protocol (PPP) [4]. This protocol enables the client to connect to a remote network on which he is identified by a login/password pair. In the current state of industrial products, the PPP protocol is frequently used combined with the RADIUS (<<Remote Authentication Dial-In User Service>>) protocol [5,6] for the control of resources on access routers; when an access router receives a PPP connection request sent by a client terminal, it relays the request to an authentication server using the RADIUS protocol; when the authentication server responds to the access router, the response may contain a number of elements determining the way in which the client traffic must be processed by the access router. For example, processing of traffic consists of filtering an IP address or a port or a protocol (in this case protocol denotes a field in the header of IP packets that indicates the protocol supported above the IP protocol such as, for example, the TCP protocol [7] or the UDP protocol [8]), or limiting the transmission rate on some flows.

Although it is now widely used for Internet accesses, the PPP protocol has a number of limitations:

for PC (<< Personal Computer>>) type terminals, it is fairly easy to install the PPP protocol since frequently used operating systems may be equipped with this type of protocol stack, however most non-PC terminals that can be used on an ADSL access (for example such as IP telephones, Set-Top Boxes, games consoles, etc.) are usually designed for use on LANs and do not have a PPP stack;

the use of PPP introduces encapsulation of IP packets and consequently, when PPP is used between a client and an access router, it is impossible to differentiate service qualities (in IP) in intermediate equipment between the client and the router;

the use of PPP between a client and an access router is incompatible with replication of packets in intermediate equipment, in other words with multicast, due to encapsulation of IP packets.

Concerning the RADIUS protocol, its use in ADSL equipment connections for control of resources on access routers, has the disadvantage that the coding system for RADIUS parameters for processing IP traffic of a client is usually proprietary.

There are other protocols specific to the control of resources, for example COPS [9](<< Common Open Policy Service protocol>>) or MIDCOM, or more general purpose protocols for example such as SNMP [10] (<< Simple Network Management Protocol>>) or Telnet [11], that can be used to set parameters for network equipment, but in principle their implementation is now proprietary.

Finally, if the DHCP protocol is used instead of the PPP protocol, with a resource control protocol, the result is a complex organization of the network control plan; when a DHCP server assigns an IP address to a client, it must invoke an entity responsible for control of network resources so that it can program (using another protocol) parameters specific to the newly connected client terminal, on the network equipment. Moreover, this manner of managing the configuration of a client terminal and management of its traffic has operating constraint disadvantages; an operating and maintenance mechanism is necessary that regularly detects changes to the client profile (in other words flow management parameters) that take place so that traffic parameters can be updated on the programmed network equipment (usually an access router). This mechanism is complicated to set up, particularly if it is necessary to take account of client profile modifications very quickly.

Considering the disadvantages of prior art, it is obvious that there is a need for an easy-to-use mechanism on a network for management of client terminal traffic and resource control, that quickly takes account of modifications to client profiles and that does not lead to a complex organization of the network control plan. This mechanism must also be compatible with multicast and it must be useable with Internet accesses with a cable connection or an ADSL connection.

Presentation of the Invention

The invention is thus intended to overcome the disadvantages of prior art by enabling control of resources on network equipment, data transfers using the Internet protocol, to process IP flows sent or received by a client terminal on the network, fully compatible with the network elements configuration protocol so as to simplify the network control plan and to make it possible to quickly take account of a change in the client profile; the configuration protocol selected in the invention should enable multicast and should be useable equally well on a LAN and on a network with Internet accesses (particularly with an ADSL connection).

In order to achieve these purposes, the invention firstly completely associates the configuration phase of the client terminal considered and control of resources (unlike prior art) and chooses the DHCP protocol for dynamic configuration of the hosts in the network considered. The DHCP protocol is used for configuration and for control of resources, which simplifies the control plan and enables fast (dynamic) updating of client profiles.

The DHCP protocol has the advantage of being simple and available on a wide range of different terminals. The DHCP protocol is now used very broadly in LANs for the configuration of client terminals. Its use is becoming more widespread in telecommunication operator networks, both for cable and for ADSL connections. This protocol was initially designed for use in LANs, but has gradually been extended to include some needs of public networks; in particular, it has option 82 [12] that enables a DHCP relay to insert a client line identification of the client terminal that makes this request into each DHCP request, this line identification information that corresponds to option 82 is called 'DHCP-RAIO' type information (<< DHCP-Relay Agent Information Option>>) in the remainder of this presentation. The DHCP relay function enables network equipment to retransmit DHCP messages between clients and servers when the clients and servers are on different LANs and DHCP relay agents are used to implement a centralized DHCP service for a set of LANs.

The invention adds an important function that is missing in the DHCP protocol; namely, a function to set parameters on the access router that routes traffic for the client terminal considered, the manner in which traffic for the client to which DHCP has given an IP address should be processed.

The invention uses the DHCP configuration phase of the client terminal considered so that at the same time, it sets parameters controlling the manner in which the network should process traffic sent by the terminal or to the terminal, by automatically configuring the access router that routes traffic between the terminal and the network (particularly traffic between the network and the DHCP terminal configuration server) as a function of values of IP flow processing parameters given for this terminal.

When a client terminal is connected to the client line (connection line between the terminal and the DHCP server(s) capable of configuring it, through an access router) on the network, it sends a DHCPDISCOVER message on the network, and in response receives lease proposals from DHCP servers on the network, it accepts a proposal from a DHCP server (usually the first it receives) and sends a DHCPREQUEST message to accept the lease from the server and at this time, according to the invention, an identification information about the client line on which the client terminal is located, is inserted in the DHCPREQUEST request and after being completed, this request is sent to the server through the router. This client line identification information is associated with values of flow processing parameters of the client line for the corresponding client terminal (client profile) and if these values are modified, the identification information is associated with the new values. According to the invention, all that is necessary is then to use this identification information contained in the completed DHCP request, for example the DHCPREQUEST request completed and distributed on the network, to obtain the corresponding set of flow processing parameter values and, depending on this set, to configure the access router so that it makes the corresponding processing on the flows that it is routing and that concern the terminal line. The access router must obviously be configurable according to a profile, but this is the case for most routers at the moment. Those skilled in the art will note that the process according to the invention can easily be adapted to process the case in which the terminal is already connected to the network and renews its lease.

More precisely, in its general embodiment, the invention is a process for automatic configuration of an access router compatible with the DHCP protocol, to perform specific automatic processing of IP flows from a client terminal in a computer network, as a function of a given set of flow processing parameter values corresponding to the client line of the client terminal, the access router routing DHCP traffic between the client terminal and every DHCP server on the network that can propose a lease to this client terminal, characterized in that it comprises the following steps consisting of:

a) inserting information enabling identification of the client line of the client terminal into the contents of a DHCP DHCPREQUEST configuration request sent on the network by the client terminal to accept a lease proposal from a DHCP server on the network, this information being associated with the client line and values of flow processing parameters corresponding to the client line of the client terminal, and transmitting the request, thus completed with the identification information, to the DHCP server through the access router; and b) using the identification information of the client line to obtain values of flow processing parameters associated with it; and c) configuring the access router with the values of flow processing parameters obtained in step b) such that it is capable of carrying out the corresponding processing of packets in data flows routed on the client line corresponding to the identification information associated with these parameter values.

Note that, similarly, the client line identification information of the client terminal may also be inserted in step a) of the process, on any other type of DHCP message than the DHCPREQUEST relayed to a server (for example DHCP-DISCOVER).

One particular embodiment of the invention, called mode with specific processing, is a method for automatic configuration of an access router according to the general mode, in which the values of flow processing parameters are capable of configuring the access router so that it can perform operations on routed flows consisting of:

filtering some network IP addresses, for flows in the client to network or network to client direction; or filtering some ports, for flows in the client to network or network to client direction; or filtering some IP protocols, for flows in the client to network or network to client direction; or limiting the IP flow rate to or from some addresses or some IP ports; or maintaining a specific service quality for some IP flows, for flows in the client to network or network to client direction.

Therefore, this embodiment provides a means of applying a specific profile for managing flows at a client terminal, particularly when it is connected to the network.

It is advantageous to use a DHCP-RAIO type information (that can be used with the DHCP message option 82) as information for identification of the client line on which the client terminal is located, and this is why information used to identify the client terminal is DHCP-RAIO type information, in the mode with DHCP-RAIO according to the invention, which is a method for automatic configuration of an access router according to the general mode or according to the mode with specific processing.

Another advantageous embodiment of the invention, called mode with profiles server, is a method for automatic configuration of an access router according to the general mode or according to the mode with specific processing or according to the mode with DHCP-RAIO, in which:

a profiles server, comprising a database in which values of flow processing parameters corresponding to the client line of the client terminal associated with the client line identification information for this terminal is stored, is connected to the network, for each client terminal in the network for which flows have to be processed; since the profiles server can be queried, using client line identification information as query key, and being capable of providing values of flow processing parameters associated with the query key, in response to a query;

in step b), the values of flow processing parameters are obtained by querying the profiles server, using the client line identification information as query key.

This embodiment is particularly advantageous when resources have to be controlled for a large number of terminals.

Finally, the invention also relates to a device for implementing a new router configuration process. More precisely, the invention also relates to a general device that is an automatic configuration device for an access router, compatible with the DHCP protocol, for performing specific automatic processing of IP flows from a client terminal in a computer network, as a function of a given set of values of flow processing parameters corresponding to the client line of the client terminal, the access router routing DHCP traffic between the client terminal and any DHCP server on the network that can propose a lease to this client terminal, characterized in that it comprises:

an SP profiles server connected to the network, comprising a database in which values of flow processing parameters corresponding to the client line of the client terminal associated with the client line identification information for this terminal is stored, for each client terminal in the network for which flows have to processed; the profiles server being capable of:

receiving a query request from a network entity, using the client line identification information as query key; and transmitting values of flow processing parameters associated with the query key of the request, in response to the query request;

an insertion module M1 capable of:

receiving a DHCPREQUEST configuration request from the client terminal on the network; and inserting client line identification information for the client terminal that is sending the request, into the received configuration request; and transmitting the request completed with the client line identification information to the DHCP server for which the lease proposal is accepted by the client terminal in the DHCPREQUEST request; and transmitting the client line identification information to a module M2;

a query module M2 capable of:

receiving a client line identification information; and transmitting a query request to the profiles server SP, with the received client line identification information as query key; and receiving a reply from the profiles server SP concerning the transmitted query request; and transmitting the values of flow processing parameters associated with the client line identification information received in the response from the profiles server, to a module M3;

a configuration module M3 capable of receiving values of flow processing parameters associated with client line identification information for configuration of the access router; and configuring the access router as a function of the received values of flow processing parameters so that it is capable of performing the corresponding processing of packets in data flows routed on the client line identified by the identification information associated with these parameter values.

The invention also relates to a device with specific processing that is a device for automatic configuration of an access router according to the general device in which the values of flow processing parameters are used to configure the access router so that it can carry out the following operations on routed flows:

filter some network IP addresses, for flows in the client to network or network to client direction; or filter some ports, for flows in the client to network or network to client direction; or filter some IP protocols, for the flows in the client to network or network to client direction; or limit the IP flow rate to or from some IP addresses or some ports; or provide a specific service quality for some IP flows, for flows in the client to network or network to client direction.

The invention also relates to a device for automatic configuration of an access router, called a device with DHCP-RAIO, which is a device according to the general device or according to the device with specific processing in which DHCP-RAIO type information is used to identify the client terminal.

As those skilled in the art will realize from the various embodiments described, the invention differs from prior art in several respects, and particularly by the important fact that the DHCP configuration process of a client terminal is no longer separate from the resource control process, and quite the contrary they are done concomitantly using the same protocol.

Applications of the invention relate to computer networks and telecommunication networks (with digital subscriber lines at ordinary speed for example with a client cable connection, or high speed lines, for example an ADSL connection), and Internet accesses of equipment to these networks.

BRIEF DESCRIPTION OF THE DRAWINGS

The characteristics and advantages of the invention presented above, and others, will become clear from the description of particular embodiments given as examples, with reference to the attached drawings, in which:

In FIGS. 1 to 4, identical or similar objects have the same reference numbers.

DETAILED PRESENTATION OF PARTICULAR EMBODIMENTS

In the method for automatic configuration of an access router according to the invention, it may be advantageous to make use of the DHCPACK response from the DHCP client terminal configuration server, that passes through the access router to be configured as a function of the client terminal profile, to transmit flow processing parameters to the router for its configuration. All the router needs to do then is to extract parameters from the message, before routing the message to the terminal to start its configuration. Thus, the corresponding particular embodiment and a method for automatic configuration of an access router according to the general mode or according to the mode with specific processing or according to the mode with DHCP-RAIO or according to the mode with profiles server in which:

the values of flow processing parameters obtained in step b) are transmitted to the DHCP server, for which the lease proposal is accepted by the client terminal; and these values of flow processing parameters are inserted in the DHCPACK response of the DHCP server to the DHCPREQUEST request from the client terminal; and the DHCPACK response, to which values of flow processing parameters have been added, is transmitted to the access router; and when the access router receives the completed DHCPACK message, the values of flow processing parameters are extracted from the message and the message from which the flow processing information has been extracted is transmitted to the client terminal; and the configuration of the access router in step c) is made with values of flow processing parameters extracted from the completed DHCPACK message received by the access router.

Concerning the device for implementation of the method according to the invention, different choices can be made about the implantation of functional modules M1, M2 and M3. This adaptation flexibility is one of the advantages of the invention and applies to the three versions of the device, in other words the general device and also the device with specific processing and the device with DHCP-RAIO.

A first module implantation choice that is valid for any of the device versions mentioned above, is shown in FIG. 1: modules M1, M2 and M3 are implanted on the access router 2. The operation of the device is also indicated; the client terminal 1 sends a DHCPREQUEST message 4 to the insertion module M1 5 that inserts terminal line identification information, or an identifier ID, into the message, and transmits the completed message 6 to the DHCP server 3 that responds to the terminal with a DHCPACK message 7; the module M1 transmits the identifier ID 8 to the query module M2 9 that sends a query request 10 to the profiles server SP 11, which responds by transmitting values of flow processing parameters 12 corresponding to the identifier ID, to module M2; module M2 transmits these values 13 to the configuration module M3 14 that then configures 15 the router to process flows for the terminal.

Figure 1:
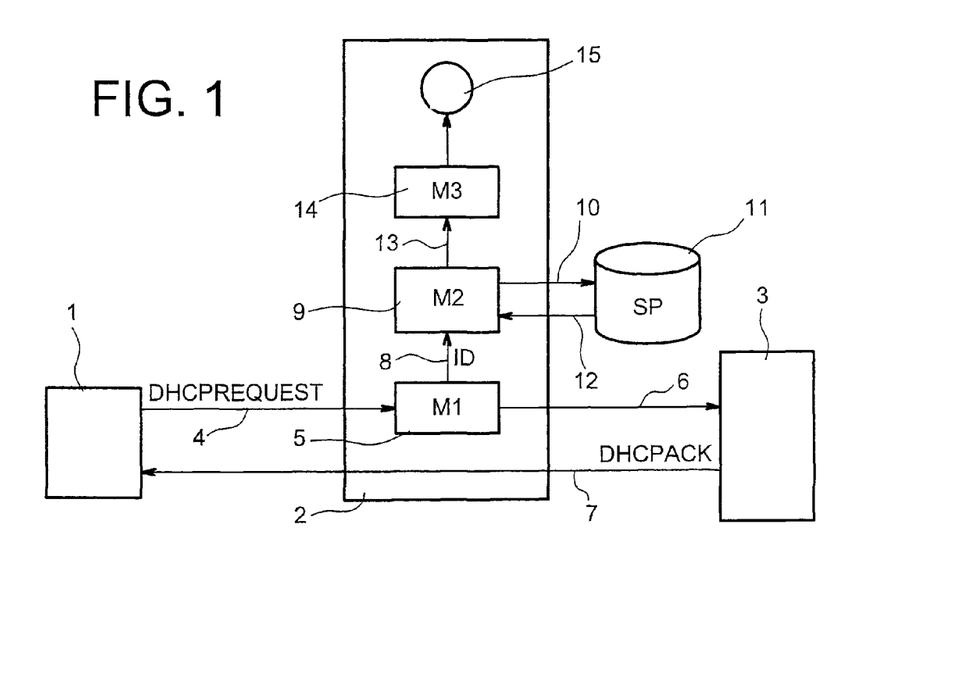
FIG. 1 shows a diagram of a device according to the invention in which modules M1, M2 and M3 are implanted on the access router 2.
Figure 2:
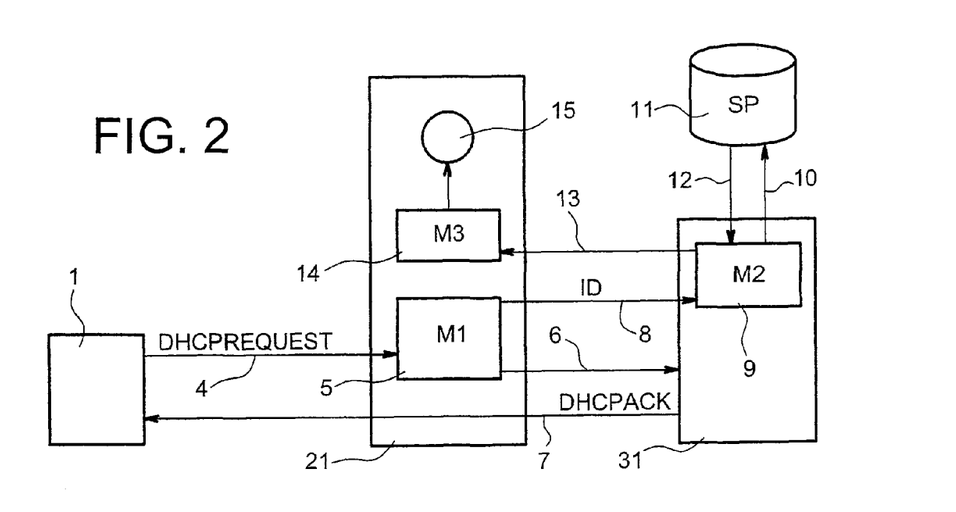
FIG. 2 is a diagram of a device according to the invention in which modules M1 and M3 are implanted on the access router 21 and module M2 is implanted on the DHCP server 31.

A second choice for implantation of modules, valid for any of the versions of the device is shown in FIG. 2; differences from FIG. 1 are shown on the access router 21 in which the modules M1 and M3 are implanted, and on the DHCP server 31 in which module M2 is implanted.

Figure 3:
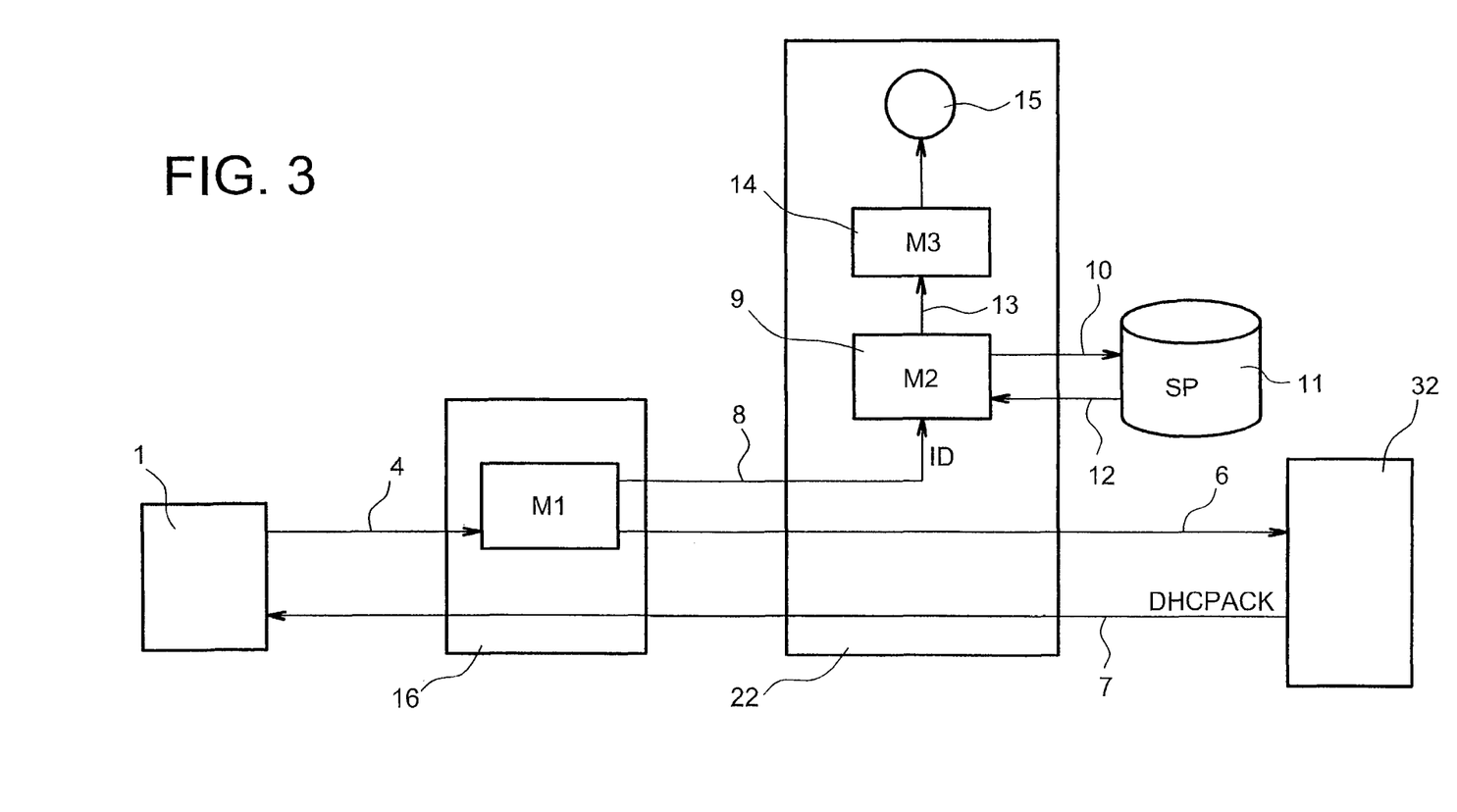
FIG. 3 is a diagram of a device according to the invention in which the module M1 is implanted on a relay agent DHCP 16 and modules M2 and M3 are implanted on the access router 22.

A third choice for implantation of modules, valid for any of the versions of the device, is shown in FIG. 3; modules M2 and M3 are implanted on the access router 22; a DHCP relay agent 16 through which traffic passes between the client terminal 1 and the access router 22, particularly towards the DHCP server 32.

Figure 4:
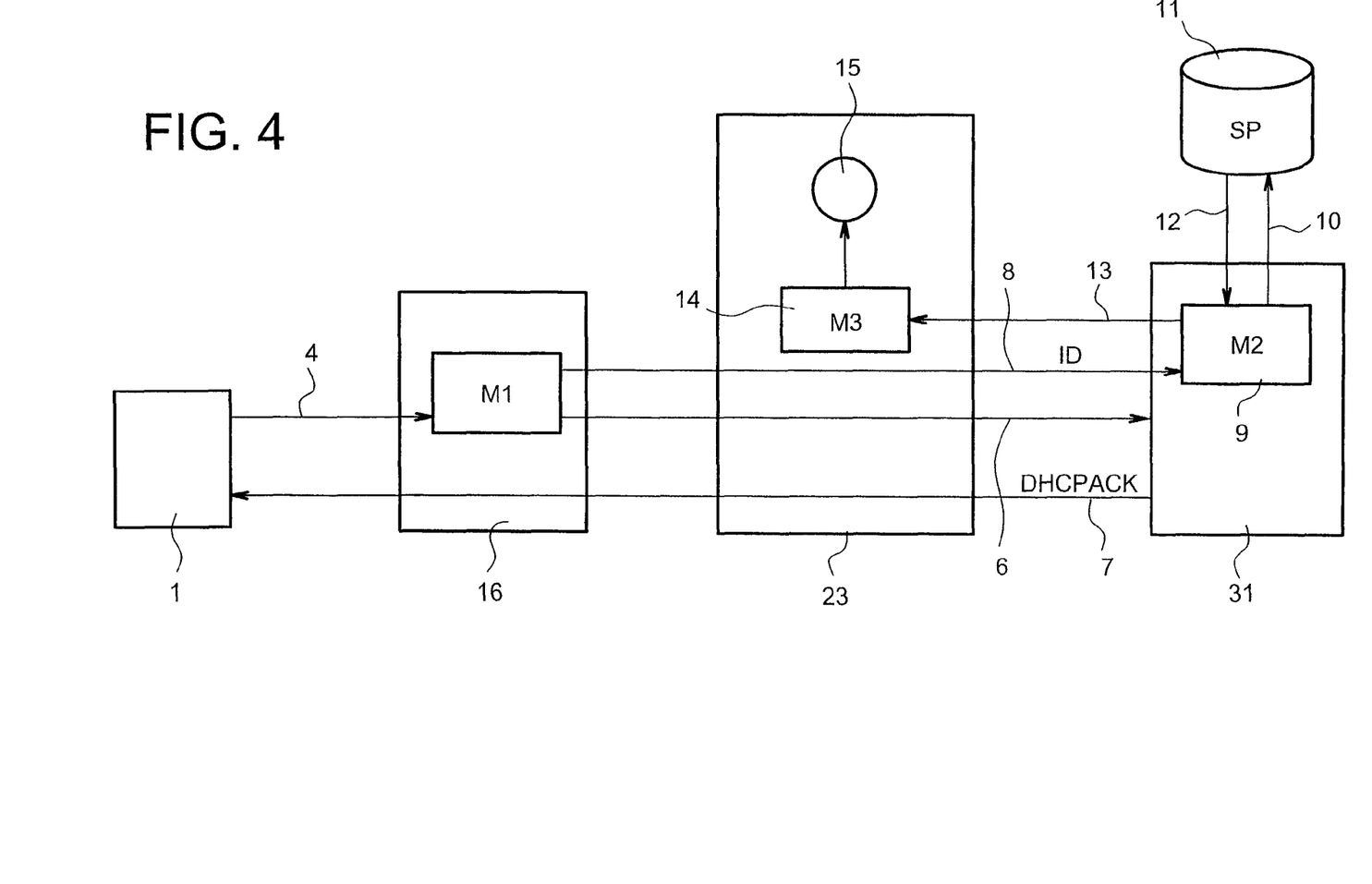
FIG. 4 is a diagram of a device according to the invention in which module M1 is implanted on a DHCP relay agent 16, module M2 is implanted on the DHCP server 31 and module M3 is implanted on the access router 23.

A fourth choice for implantation of modules, valid for any of the versions of the device, is shown in FIG. 4; module M1 is implanted on a DHCP relay agent through which traffic passes between the client terminal 1 and the access router 23, particularly to the DHCP server 31; module M2 is implanted on the server 31; module M3 is implanted on the access router 23.

Other variants are possible, particularly concerning the profiles server SP that is external in FIGS. 1 to 4, but that could for example be implanted on the access router or on the DHCP server.

References

The RFC reports mentioned in references are available on the Internet site of the IETF (<< Internet Engineering Task Force>>) organization at the following address: http://www.ietf.org (on the RFC page).

[1]: RFC1180
[2]: RFC791
[3]: RFC2131
[4]: RFC1661
[5]: RFC2865
[6]: RFC2866
[7]: RFC793
[8]: RFC768
[9]: RFC2748
[10]: see Internet site: www.snmp.com
[11]: RFC854
[12]: RFC3046

The invention claimed is:

1. Method for automatic configuration of an access router, compatible with the DHCP protocol, for specific automatic processing of IP flows from a client terminal in a computer network, as a function of a given set of values of flow processing parameters corresponding to a client line on which the client terminal is located, the access router routing DHCP traffic between the client terminal and any DHCP server on the network capable of proposing a lease to this client terminal, characterized in that it comprises the following steps:

a) receiving, by a DHCP relay agent, a DHCP request sent on the network by the client terminal, and inserting, by the DHCP relay agent, information enabling identification of the client line on which the client terminal is located into the contents of the DHCP request sent on the network by the client terminal, and transmitting the request, thus completed with the identification information of the client line, to a DHCP server through the access router; and b) querying a profiles server, using the identification information of the client line as a query key, to obtain values of flow processing parameters associated with it for configuring the access router with the values of flow processing parameters forprocessing traffic flows between the client terminal and the network;

said profiles server comprising a database associating and storing values of flow processing parameters corresponding to the client line on which the client terminal is located, with the client line identification information for this terminal;

c) configuring the access router with the values of flow processing parameters obtained in step b); and d) processing traffic flows between the client terminal and the network by the access router according to the values of flow processing parameters.

2. Method according to claim 1 in which the values of flow processing parameters configure the access router so that it performs operations on routed flows including:

filtering some network IP addresses, for flows in the client to network or network to client direction; or filtering some ports, for flows in the client to network or network to client direction; or filtering some IP protocols, for flows in the client to network or network to client direction; or limiting the IP flow rate to or from some addresses or some IP ports; or maintaining a specific service quality for some IP flows, for flows in the client to network or network to client direction.

3. Method according to either claim 1 or 2 in which information for identification of the client line is a DHCP-RAIO type information.

4. Method according to claim 1 or 2 in which the DHCP requests belongs to the group comprising:

a DHCPREQUEST request; and
a DHCPDISCOVER request.

5. Method according to claim 1 or 2 in which:

the values of flow processing parameters obtained in step b) are transmitted to the DHCP server, for which a lease proposal is accepted by the client terminal; and these values of flow processing parameters are inserted in the DHCPACK response of the DHCP server to the DHCPREQUEST request from the client terminal; and the DHCPACK response, to which values of flow processing parameters have been added, is transmitted to the access router; and when the access router receives the completed DHCPACK message, the values of flow processing parameters are extracted from the message and the message from which the flow processing information has been extracted is transmitted to the client terminal; and the configuration of the access router in step c) is made with values of flow processing parameters extracted from the completed DHCPACK message received by the access router.

6. Automatic configuration device for an access router, compatible with the DHCP protocol, for performing specific automatic processing of IP flows from a client terminal in a computer network, as a function of a given set of values of flow processing parameters corresponding to a client line on which the client terminal is located, the access router routing DHCP traffic between the client terminal and any DHCP server on the network capable of proposing a lease to this client terminal, characterized in that it comprises:

a profiles server connected to the network, comprising a database associating and storing values of flow processing parameters, corresponding to the client line on which the client terminal is located, with the client line identification information for this terminal, the profiles server performing the steps of:

receiving a query request from a network entity, using the client line identification information as a query key; and transmitting values of flow processing parameters associated with the query key of the request, in response to the query request, wherein the values of flow processing parameters configure the access router to process traffic flows between the client terminal and the network according to the flow processing parameters;

an insertion module M1 located within a DHCP relay agent and performing the steps of:

receiving a DHCP request from the client terminal on the network; and inserting client line identification information for the client terminal that is sending the request, into the received request, the client line identification information enabling identification of the client line on which the client termninal is located; and transmitting the request completed with the client line identification information to the DHCP server; and transmitting the client line identification information to a module M2;

a query module M2 performing the steps of:

receiving the client line identification information; and transmitting the query request to the profiles server, with the received client line identification information as the query key; and receiving a reply from the profiles server concerning the transmitted query request; and transmitting the values of flow processing parameters associated with the client line identification information received in the response from the profiles server, to a module M3;

a configuration module M3 performing the steps of:

receiving the values of flow processing parameters associated with client line identification information for configuration of the access router; and configuring the access router as a function of the received values of flow processing parameters for processing traffic flows between the client terminal and the network.

7. Device according to claim 6 in which the values of flow processing parameters configure the access router so that it carries out the following operations on routed flows:

filter some network IP addresses, for flows in the client to network or network to client direction; or filter some ports, for flows in the client to network or network to client direction; or filter some IP protocols, for the flows in the client to network or network to client direction; or limit the IP flow rate to or from some IP addresses or some ports; or provide a specific service quality for some IP flows, for flows in the client to network or network to client direction.

8. Device according to claim 6 or 7 in which information for identification of the client line is a DHCP-RAIO type information.

9. Device according to claim 6 or 7 in which the modules M2 and M3 are implanted on the access router.

10. Device according to claim 9 in which the profiles server is implanted on the access router.

11. Device according to claim 9 in which the profiles server is implanted on the DHCP server.

12. Device according to claim 6 or 7 in which the module M3 is implanted on the access router and the module M2 is implanted on the DHCP server of the network for which the lease proposal is accepted in the DHCPREQUEST configuration request sent by the client terminal.

13. Device according to claim 6 or 7 in which the module M1 is implanted on the DHCP relay agent, through which traffic passes between the client terminal and the access router, and modules M2 and M3 are implanted on the access router.

14. Device according to claim 13 in which the relay agent is a Digital Subscriber Line Access Multiplexer (DSLAM).

15. Device according to claim 6 or 7 in which the module M1 is implanted on the DHCP relay agent, through which traffic passes between the client terminal and the access router, the module M2 is implanted on the DHCP server and the module M3 is implanted on the access router.

16. Device according to claim 15 in which the relay agent is a Digital Subscriber Line Access Multiplexer (DSLAM).

17. Method for automatic configuration of an access router, compatible with the DHCP protocol, for specific automatic processing of IP flows from a client terminal in a computer network, as a function of a given set of values of flow processing parameters corresponding to a client line on which the client terminal is located, the access router routing DHCP traffic between the client terminal and any DHCP server on the network capable of proposing a lease to this client terminal, characterized in that it comprises the following steps:

a) receiving, by the access router, a DHCP request sent on the network by the client terminal, and inserting, by the access router, information enabling identification of the client line on which the client terminal is located into the contents of the DHCP request sent on the network by the client terminal, and transmitting the request, thus completed with the identification information of the client line, to a DHCP server through the access router; and b) querying a profiles server, using the identification information of the client line as a query key, to obtain values of flow processing parameters associated with it for configuring the access router with the values of flow processing parameters for processing traffic flows between the client terminal and the network;

said profiles server comprising a database associating and storing values of flow processing parameters, corresponding to the client line on which the client terminal is located, with the client line identification information for this terminal;

c) configuring the access router with the values of flow processing parameters obtained in step b); and d) processing traffic flows between the client terminal and the network by the access router according to the values of flow processing parameters.

18. Method according to claim 17 in which:

the values of flow processing parameters obtained in step b) are transmitted to the DHCP server, for which a lease proposal is accepted by the client terminal; and these values of flow processing parameters are inserted in the DHCPACK response of the DHCP server to the DHCPREQUEST request from the client terminal; and the DHCPACK response, to which values of flow processing parameters have been added, is transmitted to the access router; and when the access router receives the completed DHCPACK message, the values of flow processing parameters are extracted from the message and the message from which the flow processing information has been extracted is transmitted to the client terminal; and the configuration of the access router in step c) is made with values of flow processing parameters extracted from the completed DHCPACK message received by the access router, and wherein the information enabling identification of the client line is DHCP-RAIO type information.

19. Automatic configuration device for an access router, compatible with the DHCP protocol, for performing specific automatic processing of IP flows from a client terminal in a computer network, as a function of a given set of values of flow processing parameters corresponding to a client line on which the client terminal is located, the access router routing DHCP traffic between the client terminal and any DHCP server on the network capable of proposing a lease to this client terminal, characterized in that it comprises:

a profiles server connected to the network, comprising a database associating and storing values of flow processing parameters, corresponding to the client line on which the client terminal is located, with the client line identification information for this terminal, the profiles server performing the steps of:

receiving a query request from a network entity, using the client line identification information as a query key; and transmitting values of flow processing parameters associated with the query key of the request, in response to the query request, wherein the values of flow processing parameters configure the access router to process traffic flows between the client terminal and the network according to the flow processing parameters;

an insertion module M1 located within the access router and performing the steps of:

receiving a DHCP request from the client terminal on the network; and inserting client line identification information for the client terminal that is sending the request, into the received request, the client line identification information enabling identification of the client line on which the client terminal is located; and transmitting the request completed with the client line identification information to the DHCP server; and transmitting the client line identification information to a module M2;

a query module M2 performing the steps of:

receiving the client line identification information; and transmitting the query request to the profiles server, with the received client line identification information as the query key; and receiving a reply from the profiles server concerning the transmitted query request; and transmitting the values of flow processing parameters associated with the client line identification information received in the response from the profiles server, to a module M3;

a configuration module M3 performing the steps of:

receiving the values of flow processing parameters associated with client line identification information for configuration of the access router; and configuring the access router as a function of the received values of flow processing parameters for processing traffic flows between the client terminal and the network.

20. Device according to claim 19 wherein the client line identification information is DHCP-RAIO type information.

* * * * *